US009480198B2

(12) United States Patent
Treffer et al.

(10) Patent No.: US 9,480,198 B2
(45) Date of Patent: Nov. 1, 2016

(54) SWIVEL DRAWBAR HITCH MECHANISM FOR PULL-TYPE IMPLEMENT

(71) Applicant: AGCO Corporation, Hesston, KS (US)

(72) Inventors: Douglas R. Treffer, Newton, KS (US); Martin E. Pruitt, Hesston, KS (US); Jeffrey Funk, Hillsboro, KS (US); Shane A. Bollinger, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 14/708,982

(22) Filed: May 11, 2015

(65) Prior Publication Data

US 2015/0334910 A1 Nov. 26, 2015

Related U.S. Application Data

(60) Provisional application No. 62/001,840, filed on May 22, 2014.

(51) Int. Cl.
*A01B 71/06* (2006.01)
*A01B 59/042* (2006.01)
*B60D 1/167* (2006.01)

(52) U.S. Cl.
CPC ............ *A01B 59/042* (2013.01); *A01B 71/06* (2013.01); *A01B 71/066* (2013.01)

(58) Field of Classification Search
CPC ... A01B 71/006; A01B 59/042; B60D 1/167
USPC ....... 172/439, 440, 441, 442, 443, 449, 450, 172/677, 679, 680, 678; 56/15.2, 15.1, 56/15.7, 12.6, 15.9; 280/416.2, 477, 280/479.3, 455.1, 506, 492, 493, 504, 509, 280/508
See application file for complete search history.

(56) References Cited

U.S. PATENT DOCUMENTS

| | | | | | |
|---|---|---|---|---|---|
| 4,738,461 | A | * | 4/1988 | Stephenson | B62D 13/00 180/14.4 |
| 4,776,606 | A | * | 10/1988 | Stephenson | B60K 17/28 172/248 |
| 4,805,927 | A | * | 2/1989 | Stephenson | A01B 71/066 172/272 |
| 5,186,271 | A | * | 2/1993 | McLean | A01B 71/066 180/14.4 |
| 5,265,403 | A | * | 11/1993 | Franet | B62D 49/065 280/462 |
| 5,706,901 | A | * | 1/1998 | Walters | A01B 71/066 172/439 |
| RE35,835 | E | * | 7/1998 | Eidam | A01B 71/066 172/47 |
| 6,412,570 | B1 | * | 7/2002 | Pruitt | A01B 59/042 172/449 |
| 7,334,645 | B2 | * | 2/2008 | Stevenson | A01D 34/86 172/677 |
| 8,469,386 | B2 | | 6/2013 | Clark et al. | |
| 2012/0151892 | A1 | * | 6/2012 | Clark | A01B 59/042 56/15.7 |
| 2014/0150392 | A1 | * | 6/2014 | Afting | A01B 59/042 56/15.7 |

* cited by examiner

*Primary Examiner* — Jacob Knutson

(57) ABSTRACT

A drawbar hitch mechanism has a fore-and-aft extending receiver, a gearbox assembly coupled to the receiver and a tongue assembly attached to the gearbox assembly. A first pivot mechanism couples the receiver with the gearbox assembly for side-to-side movement about a longitudinal axis of the receiver. A draft arm is configured to disperse draft loads between the tongue assembly and the receiver. A second pivot mechanism couples the gearbox assembly and the draft arm. The second pivot mechanism is oriented such that it pivots about an upright axis such that the gearbox assembly and second pivot mechanism enable pivoting movement of the tongue assembly relative the receiver.

5 Claims, 3 Drawing Sheets

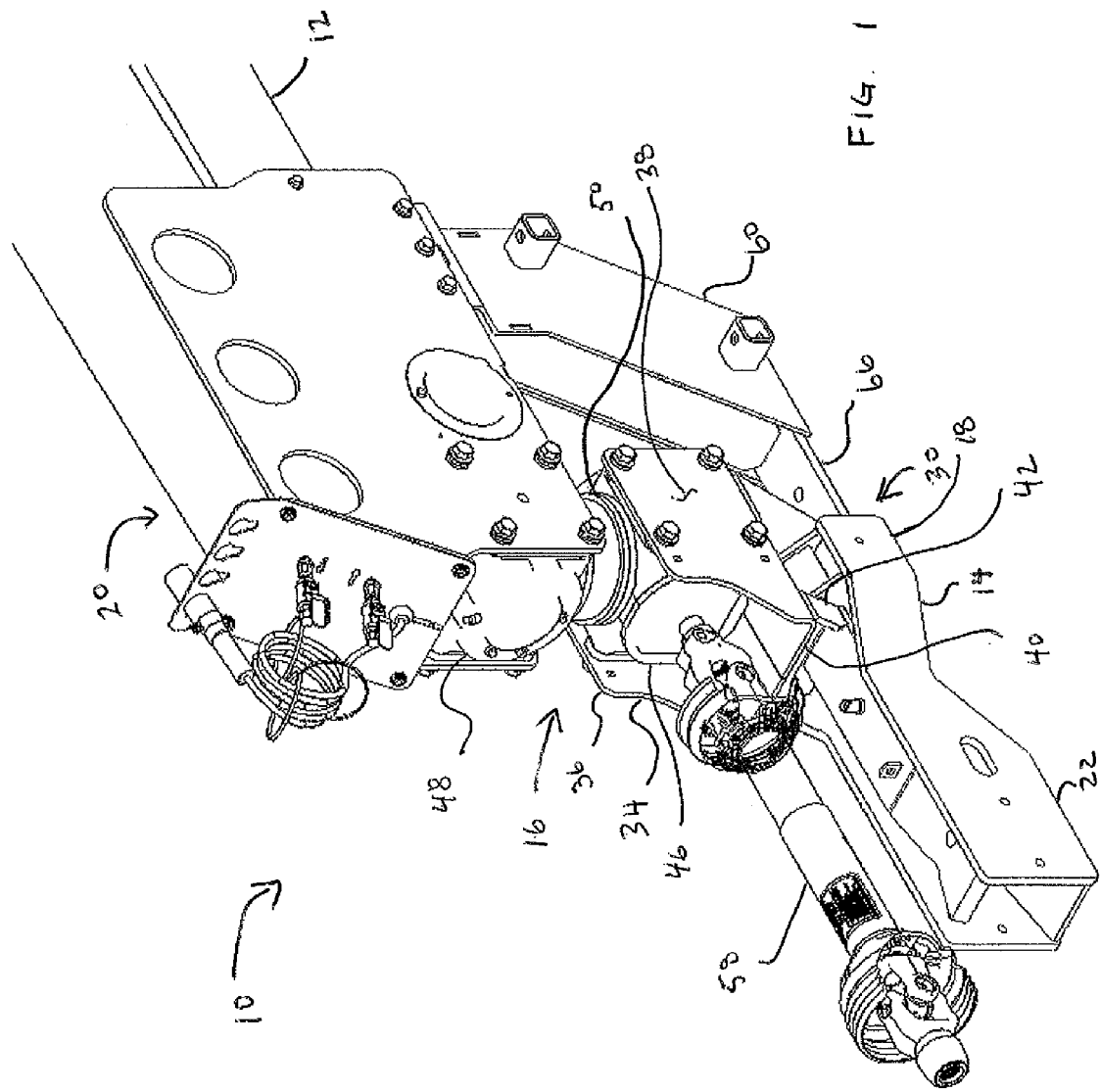

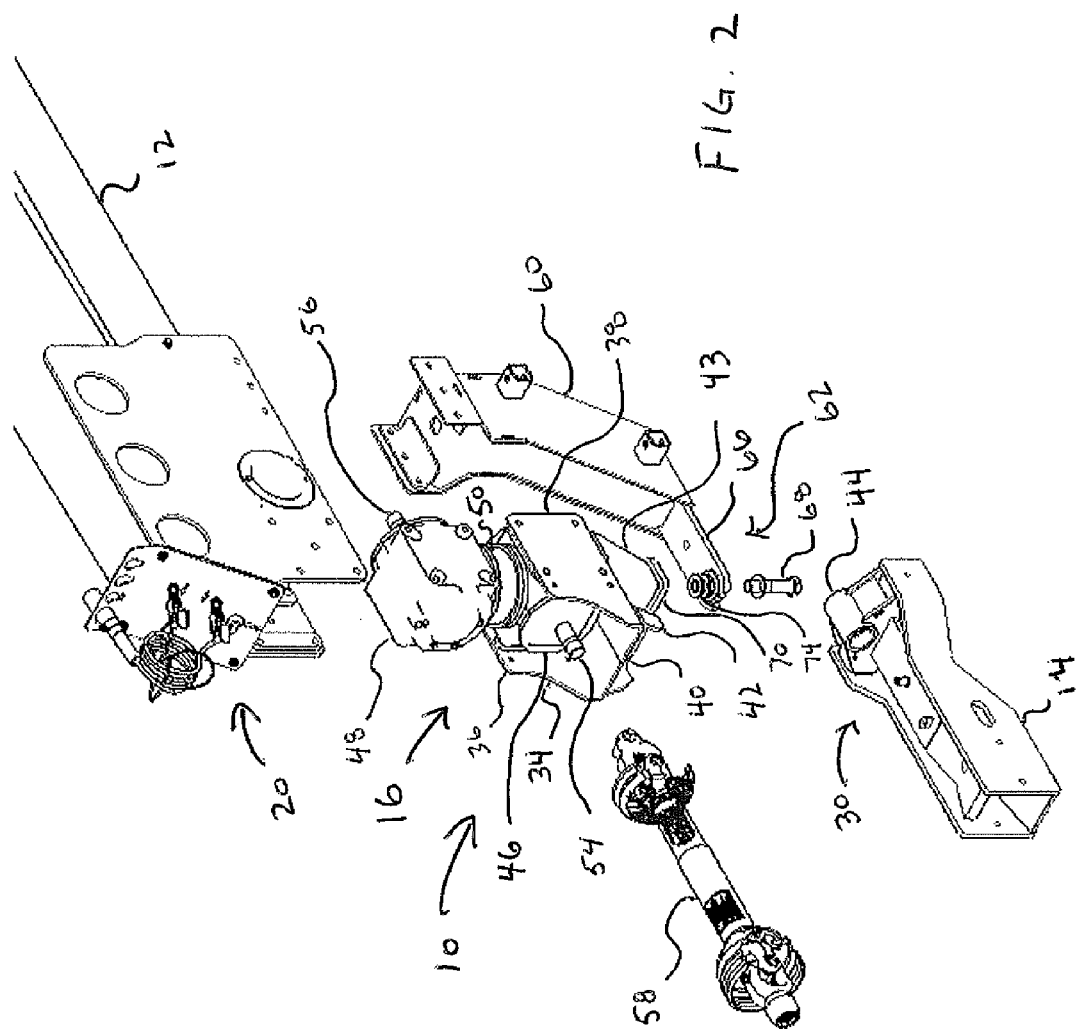

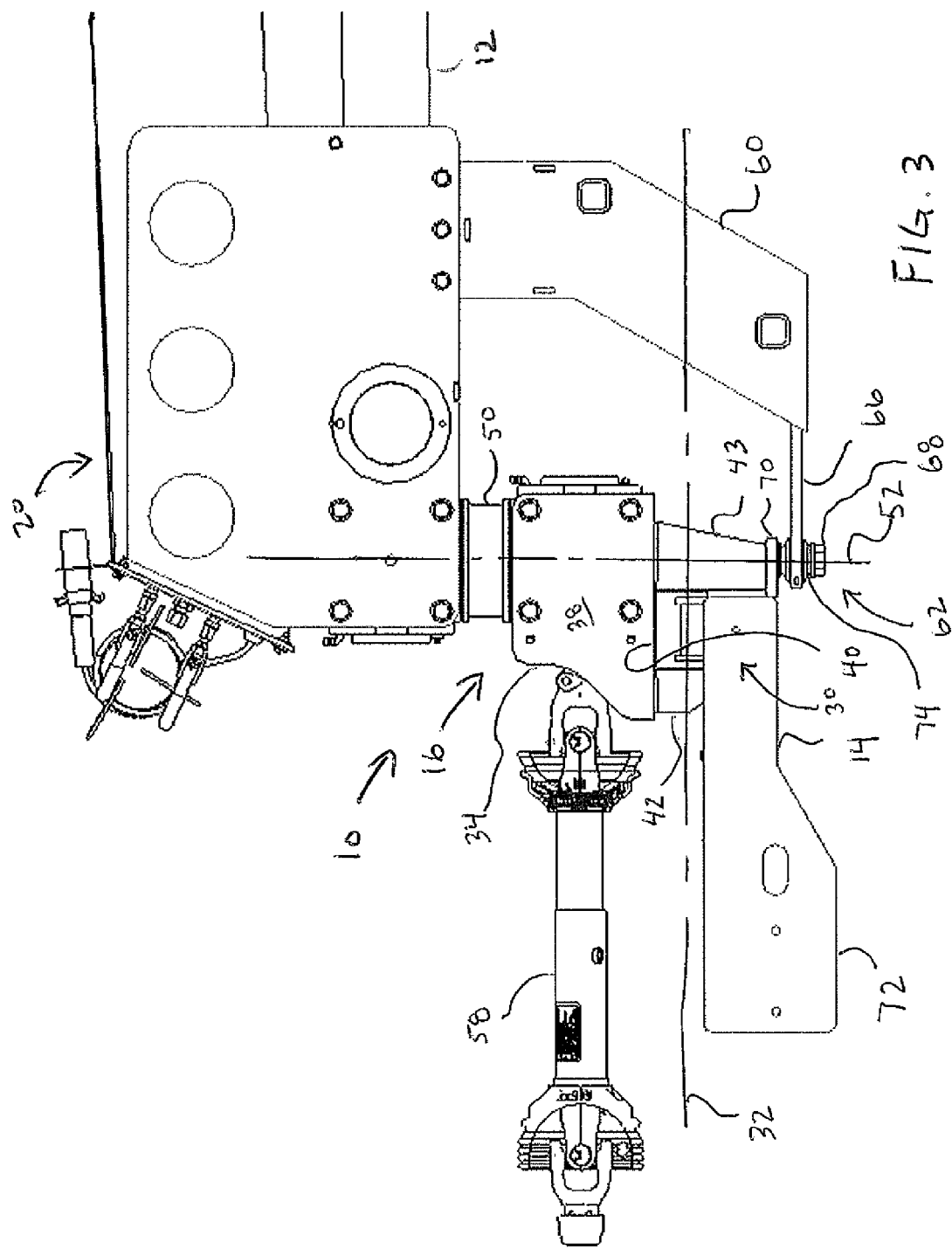

SWIVEL DRAWBAR HITCH MECHANISM FOR PULL-TYPE IMPLEMENT

RELATED APPLICATION

Under provisions of 35 U.S.C. §119(e), Applicants claim the benefit of U.S. Provisional Application No. 62/001,840 entitled SWIVEL DRAWBAR HITCH MECHANISM FOR PULL-TYPE IMPLEMENT and filed May 22, 2014, which is incorporated herein by reference.

BACKGROUND OF THE INVENTION

1. Field of Invention

This invention relates to the field of pull-type farm implements and, more particularly, to a swivel drawbar hitch mechanism for establishing a draft connection between the pulling tractor and the pull-type implement.

2. Description of Related Art

Agricultural pull-type implements are generally towed by a tractor using a hitch assembly coupled to a drawbar of the tractor. Swivel hitch assemblies desirably allow for relative movement of the pull-type implement with respect to the tractor, such as when turning corners or travelling over uneven surfaces. During such movements, the hitch assembly may be subject to various loads.

One example of a swivel drawbar hitch includes a gearbox assembly having a lower right-angle gearbox and an upper right angle gearbox that swivels about an upright axis relative to the lower right angle gearbox. The upper and lower right angle gearboxes share a common upright drive shaft that couples an input, U-joint driveline assembly (e.g., components conveying power from a power take-off residing at the tractor to the lower right angle gearbox) to an output, U-joint driveline assembly extending from the upper right angle gearbox to the pull-type implement. However, all the draft loads of the pull-type implement are carried through the swivel gearbox. As implements get larger and are designed to travel at faster speeds through the field and on the road, the draft loads increase. This can lead to wear and accelerate the failure of one or more components of the hitch assembly.

Overview of the Invention

In one embodiment, the invention is directed to a drawbar hitch mechanism for use in establishing a draft connection between the pulling vehicle and a pull-type implement. The drawbar hitch mechanism has a fore-and-aft extending elongated receiver, a gearbox assembly coupled to a rearward end of the elongated receiver and a tongue assembly attached to the gearbox assembly. The gearbox assembly pivotably connects the receiver and the tongue assembly for left and right pivoting movement about an upright axis of the gearbox assembly. The drawbar hitch mechanism has a first pivot mechanism coupling the elongated receiver with the gearbox assembly that enables side-to-side movement of the pull-type implement relative to the pulling vehicle about a longitudinal axis of the receiver. The first pivot mechanism comprises a bracket fixed to the gearbox assembly with transverse members pivotably connected to a pivot bar on the elongated receiver. A draft arm is configured to disperse draft loads between the tongue assembly and the receiver. The draft arm is attached to the tongue assembly at one end. The drawbar hitch mechanism also has a second pivot mechanism having a downward-reaching leg extending from the bracket of the gearbox assembly and a forward reaching tang on the draft arm pivotably coupled with the downward-reaching leg. The second pivot mechanism is oriented such that it pivots about the upright axis such that the gearbox assembly and second pivot mechanism enable pivoting movement of the tongue assembly relative the elongate receiver about the upright axis, with the upright axis being substantially perpendicular to the longitudinal axis of the first pivot mechanism. The downward-reaching leg extends downward so that a distal end of the downward-reaching leg to which the tang is connected is below the longitudinal axis.

These and other features and advantages of this invention are described in, or are apparent from, the following detailed description of various example embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein:

FIG. 1 is a partial perspective view of a drawbar hitch mechanism used to establish a draft connection between the pulling tractor and the pull-type implement;

FIG. 2 is a partial, exploded perspective view of the drawbar hitch mechanism shown in FIG. 1; and FIG. 3 is a partial side view of the drawbar hitch mechanism shown in FIG. 1.

The drawing figures do not limit the present invention to the specific embodiments disclosed and described herein. The drawings are not necessarily to scale, emphasis instead being placed upon clearly illustrating the principles of the preferred embodiment. Corresponding reference characters indicate corresponding parts throughout the views of the drawings.

DETAILED DESCRIPTION OF THE PREFERRED EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Referring to FIG. 1, shown is a partial perspective view of a swivel drawbar hitch mechanism 10 which may be utilized with a typical tractor and a pull-type implement such as a mower conditioner. Although described in the context of a system comprising a tractor and a mower conditioner, it should be understood by one having ordinary skill in the context of the present disclosure that other equipment may be substituted to equal or substantially equal effect and should not be construed as implying any limitations upon the scope of the disclosure. As is understood in the art, a tractor may have a rearwardly extending drawbar and a rearwardly extending power take-off shaft that both couple to the swivel drawbar hitch mechanism 10 in any known manner. The swivel drawbar hitch mechanism 10 is adapted for coupling the rearwardly extending drawbar with a fore-and-aft extending tongue 12 of the pull-type implement for establishing a draft connection between the tractor and the pull-type implement.

The swivel drawbar hitch mechanism 10 comprises a fore-and-aft extending elongated receiver 14 and a gearbox assembly 16 coupled to a rearward end 18 of the elongated receiver 14. A tongue assembly 20 at the forward end of the tongue 12 of the pull-type implement is attached to the gearbox assembly 16. A forward end 22 of the elongated receiver 14 may be pivotably coupled with a drawbar of a tractor so as to provide up-and-down movement in any known means such as that disclosed in commonly owned U.S. Pat. No. 8,469,386 entitled Swivel Drawbar Hitch, which is incorporated herein by reference, as the pull-type implement is towed over uneven surfaces.

The gearbox assembly 16 is coupled to the elongated receiver 14 with a first pivot mechanism 30 that enables side-to-side (yaw) movement of the pull-type implement relative to the tractor about a longitudinal axis 32 (FIG. 3) of the receiver 14. In the illustrated embodiment and as disclosed in commonly-owned U.S. Pat. No. 8,469,386, a multi-sided (e.g., 3-sided) bracket 34 is fixed to the gearbox assembly 16, and includes a first side 36 and a similarly dimensioned second side 38 that laterally opposes the first side 36. The multi-sided bracket 34 further comprises a bottom side 40 adjacent the bottom of the gearbox assembly 16, the bottom side 40 having laterally-spaced, similarly-dimensioned opposing forward transverse member (e.g., flange) 42 extending out (e.g., downwardly) from the bottom side 40 and a rear downward reaching leg 43. The forward transverse member 42 and downward reaching leg 43 are located proximal to the front and rear end of the bottom side 40, respectively. The transverse member 42 and downward reaching leg 43 receive a connector or pivot bar (e.g., cylindrical hollow sleeve) 44 of the pivot mechanism 30. In other words, the connector 44 is disposed between the transverse member 42 and downward reaching leg 43 with slots aligned with opposing open ends of the connector 44 in the longitudinal direction of the swivel drawbar hitch mechanism 10. A securing mechanism such as a suitable bolt, bushing and nut combination (not shown) is disposed in a coincident manner through the slots of the transverse member 42 and downward reaching arm 43, secures the gearbox assembly 16 to the rearward end 18 of the elongated receiver 14 thereby enabling pivoting of the gearbox assembly 16 respective the elongated receiver 14 about the longitudinal axis 32 of the receiver 14.

As best seen in FIG. 2, the gearbox assembly 16 comprises a lower right angle gearbox 46 and an upper right angle gearbox 48. As is known in the art, the lower right angle gearbox 46 and upper right angle gearbox 48 share a common, upright drive shaft (not shown) housed within an intermediate collar 50 so that the output of lower right angle gearbox 46 is received as input by the upper right angle gearbox 48. The upper right angle gearbox 48 swivels (relative to the lower right angle gearbox 46 located beneath the upper right angle gearbox 48) about an upright axis 52 that is common to the axis of rotation of the internal drive shaft between the two gearboxes 46, 48. The lower right angle gearbox 46 has an input shaft 54 disposed at right angles to the internal drive shaft between the two gearboxes 46 and 48. Similarly, the upper right angle gearbox 48 has an output shaft 56 disposed at right angles to the internal drive shaft between the two gearboxes 46 and 48. In some embodiments, gearboxes 46 and 48 may be obtained as a fully assembled unit.

The input shaft 54 of the lower right angle gearbox 46 is connected to the rearwardly extending power take-off shaft of the tractor via a U-joint driveline assembly 58. The output shaft 56 of the upper right angle gearbox 48 is connected to a U-joint driveline assembly (not shown) of the tongue assembly 20 in any known manner. The output shaft 56 is responsible at least in part for driving mechanically driven components (for example rotary cutters, conditioner rolls, etc.) of the pull-type implement. Thus, the swivel drawbar hitch mechanism 10 pivotally connects the receiver 14 and the tongue assembly 20 for left and right pivoting movement about upright axis 52 of the gearbox assembly 16.

According to the invention, the drawbar hitch mechanism 10 also comprises a draft arm 60 that is coupled to the gearbox assembly 16 with a second pivot mechanism 62 to disperse draft loads between the tongue assembly 20 and the receiver 14 such that not all of the draft loads are carried by the gearbox assembly 16. One end of the draft arm 60 is bolted or otherwise connected to the tongue assembly 20. The second pivot mechanism 62 comprises the downward-reaching leg 43 extending from the bottom side 40 of the multi-sided bracket 34 of the gearbox assembly 16. The draft arm 60 has a forward reaching tang 66 that is coupled with the downward-reaching leg 43 and oriented such that the second pivot mechanism 62 is also configured to pivot about the upright axis 52. In the illustrated embodiment, a bolt 68 is used to couple the tang 66 to the downward-reaching leg 43. Thus, the gearbox assembly 16 and second pivot mechanism 62 enable pivoting movement about upright axis 52 which is approximately 90° relative to the longitudinal axis 32 of the first pivot mechanism 30.

The downward-reaching leg 43 extends downward so that it has a minimum length such that a distal end 70 of the leg 43 is below the longitudinal axis 32 about which the first pivot mechanism 30 pivots. Desirably, downward-reaching leg 43 has a maximum length such that the tang 66 is able to connect to the distal end 70 of the leg 43 without extending below a bottom surface 72 of the receiver 14 to discourage trash from collecting on the tang 66. It is believed that the greater the distance the downward-reaching leg 43 extends below the longitudinal axis 32 of the first pivot mechanism 30, the more draft load will be carried by the draft arm 60, reducing the draft load through the lower and upper right angle gearboxes 46, 48.

It is to be noted that in one preferred embodiment, the second pivot connection 62 comprises a ball joint 74 received in the tang 66, as illustrated in FIG. 3. Such ball joint 74 provides a measure of flexibility during initial assembly of the second pivot connection 62, but it is not intended that second pivot connection 62 provide for any movement of receiver 12 relative to tongue assembly 20 other than horizontal swinging or swiveling movement about the upright axis 52. Thus, it is within the principles of the present invention to have the second pivot connection 62 constructed as an upright pintle and bushing or collar, for example, instead of a ball joint.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention. While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention.

What is claimed is:

1. A drawbar hitch mechanism for use in establishing a draft connection between the pulling vehicle and a pull-type implement, the drawbar hitch mechanism having a fore-and-aft extending elongated receiver, a gearbox assembly coupled to a rearward end of the elongated receiver and a tongue assembly attached to the gearbox assembly, the gearbox assembly pivotably connecting the receiver and the tongue assembly for left and right pivoting movement about an upright axis of the gearbox assembly, wherein the drawbar hitch mechanism comprises:
   a first pivot mechanism coupling the elongated receiver with the gearbox assembly that enables side-to-side movement of the pull-type implement relative to the pulling vehicle about a longitudinal axis of the receiver, wherein the first pivot mechanism comprises a bracket fixed to the gearbox assembly with transverse members pivotably connected to a pivot bar on the elongated receiver;
   a draft arm configured to disperse draft loads between the tongue assembly and the receiver, the draft arm attached to the tongue assembly; and
   a second pivot mechanism, the second pivot mechanism comprising a downward-reaching leg extending from the bracket such that the second pivot mechanism moves in side-to-side movement about the longitudinal axis during pivoting of said first pivot mechanism, the second pivot mechanism also comprising a forward reaching tang on the draft arm pivotably coupled with the downward-reaching leg and oriented such that the second pivot mechanism is configured to pivot about the upright axis such that the second pivot mechanism also enables pivoting movement of the tongue assembly relative the elongate receiver about the upright axis and such that the draft arm pivots in the side-to-side movement about the longitudinal axis with the first pivot mechanism, the upright axis being substantially perpendicular to the longitudinal axis of the first pivot mechanism, and wherein the downward-reaching leg extends downward so that a distal end of the downward-reaching leg to which the tang is connected is below the longitudinal axis.

2. The drawbar hitch mechanism of claim 1 wherein the gearbox assembly comprises a lower right angle gearbox and an upper right angle gearbox, wherein an output of the lower right angle gearbox is received as input by the upper right angle gearbox and the upper right angle gearbox swivels relative to the lower right angle gearbox about the upright axis and the lower right angle gearbox has an input shaft disposed perpendicular to the upright axis and the upper right angle gearbox has an output shaft disposed perpendicular to the upright axis.

3. The drawbar hitch mechanism of claim 1 wherein the distal end of the downward reaching leg extends no lower than a bottom surface of the receiver.

4. The drawbar hitch mechanism of claim 1 wherein the draft loads between the receiver and the tongue assembly are shared by the gearbox assembly and the draft arm.

5. The drawbar hitch mechanism of claim 1, wherein the gearbox extends upward from the bracket away from the longitudinal axis and the downward-reaching leg extends downward from the longitudinal axis, wherein pivoting of the first pivot mechanism about the longitudinal axis causes the gearbox and the downward-extending leg to pivot about the longitudinal axis.

* * * * *